US007769624B1

(12) United States Patent
Armentano et al.

(10) Patent No.: US 7,769,624 B1
(45) Date of Patent: Aug. 3, 2010

(54) METHOD AND SYSTEM FOR KNOWLEDGE MANAGEMENT AND EFFECTIVE MENTORING OF INSURANCE CLAIM PROFESSIONALS

(75) Inventors: Vincent Armentano, Glastonbury, CT (US); Susan Cronin, Lakeville, MA (US); Annmarie Tepper, Avon, CT (US); Robert J. McHugh, Saugus, MA (US); Julie Morgan, Moraga, CA (US)

(73) Assignee: Travelers Property Casualty Corp., Hartford, CT (US)

( * ) Notice: Subject to any disclaimer, the term of this patent is extended or adjusted under 35 U.S.C. 154(b) by 1900 days.

(21) Appl. No.: 10/648,808

(22) Filed: Aug. 27, 2003

Related U.S. Application Data

(60) Provisional application No. 60/406,093, filed on Aug. 27, 2002.

(51) Int. Cl.
*G06F 9/44* (2006.01)
*G06Q 40/00* (2006.01)
(52) U.S. Cl. .......................................... 705/10; 705/4
(58) Field of Classification Search .................. 705/7, 705/4
See application file for complete search history.

(56) References Cited

U.S. PATENT DOCUMENTS

| 5,523,942 | A | * | 6/1996 | Tyler et al. ..................... 705/4 |
| 6,067,525 | A | * | 5/2000 | Johnson et al. ................ 705/10 |
| 6,149,441 | A | * | 11/2000 | Pellegrino et al. ............. 434/350 |
| 6,446,653 | B2 | * | 9/2002 | Cullinane et al. ............ 137/68.25 |
| 6,581,067 | B1 | * | 6/2003 | Bjergo et al. ................. 707/104.1 |
| 7,120,647 | B2 | * | 10/2006 | Venkatesh et al. ............ 707/104.1 |
| 7,152,092 | B2 | * | 12/2006 | Beams et al. ................. 709/204 |
| 2002/0077884 | A1 | * | 6/2002 | Sketch .............................. 705/12 |
| 2003/0009742 | A1 | * | 1/2003 | Bass et al. ....................... 717/104 |
| 2003/0046125 | A1 | * | 3/2003 | Flores ............................... 705/7 |

OTHER PUBLICATIONS

Mosher, Bob. "Set Your Course for Action: Developing a Certification Training Plan". Nov. 2001. Certification Magazine. retrieved from <http://www.certmag.com/issues/nov01/feature_mosher.cfm>.*
Budd, Marjorie L. "HRD/Organisation Alignment Model". Nov. 2001. Quantum Leap Solutions Pty Ltd. pp. 1-4.*

(Continued)

*Primary Examiner*—Jonathan G. Sterrett
*Assistant Examiner*—Peter Choi
(74) *Attorney, Agent, or Firm*—Irah H. Donner; Wilmer Cutler Pickering Hale & Dorr LLP

(57) ABSTRACT

The present invention relates to a method and system for virtual mentoring of a group of individuals based on the management of their work-related knowledge. According to the embodiments of the present invention, collective experience and intellectual capital of an organization and its personnel are efficiently and intelligently gathered to provide "just-in-time" training/mentoring of the organization's personnel to enhance job performance and satisfaction and to achieve Quality Management (QM) results/outcomes. The training/mentoring can be requested by or automatically provided to the personnel via various designated access locations.

43 Claims, 3 Drawing Sheets

OTHER PUBLICATIONS

"Training Needs Assessment". Nov. 9, 1998. US Department of the Interior. retrieved from <http://www.doi.gov/hrm/pmanager/ed3.html>.*

Berry, John. "The E-Learning Factor". Nov. 6, 2000. retrieved from <http://www.internetweek.com/indepth/indepth110600.htm>.*

"Getting Results Through Learning". May 1997. Federal Human Resource Development Council.*

"A Guide to Strategically Planning Training and Measuring Results". Jul. 2000. US office of Personnel Management—Office of Workforce Relations.*

Armentano, Vincent; Beckett, Darrell. "Empowering Employees to Manage Their Own Return to Work". Nov. 2001. Risk Management. vol. 48, Issue 11. pp. 30-38.*

* cited by examiner

METHOD AND SYSTEM FOR KNOWLEDGE MANAGEMENT AND EFFECTIVE MENTORING OF INSURANCE CLAIM PROFESSIONALS

PRIORITY

This application claims the benefit of U.S. Provisional Patent Application No. 60/406,093, titled "METHOD AND SYSTEM FOR KNOWLEDGE MANAGEMENT AND EFFECTIVE MENTORING OF INSURANCE CLAIM PROFESSIONALS," filed Aug. 27, 2002, which is herein incorporated by reference in its entirety.

BACKGROUND OF THE INVENTION

1. Field of the Invention

The present invention relates to the field of knowledge management and mentoring of a group of individuals such as employees or workers of an organization. More specifically, the present invention relates to a method and system for virtual mentoring of a group of individuals, such as insurance claim professionals, based on the management of their work-related knowledge, such as the management of insurance claims.

BACKGROUND

Medical triage is often employed in the health care industry to categorize and classify patients (e.g., ill or injured persons) according to the severity of their health conditions and thereby determine who need services first. With rising health care and workers compensation costs, medical triage was designed to maximize and create the most efficient use of scarce managed care resources in medical personnel, medical facilities, and the like. While medical triage commonly occurs in emergency rooms, it can occur in other health care settings such as managed care organizations, workers compensation insurance, health care plans, and health care provider systems to steer patients away from more costly care and provide more appropriate services. For instance, medical triage can be used to steer a child with a cold away from an emergency room to preserve the latter for actual medical emergencies. Indeed, these health care organizations and systems have set up "triage centers" to serve as an extension of the utilization review process, as diversions from emergency room care, or as case management resources.

In the current medical triage environment for a managed care program, such as workers compensation (WC), a work injury claim is first called in from an employer of the injured worker to a telephone reporting center of a workers compensation insurance carrier or health care plan provider. The health and/or workers compensation insurance or care provider may have one or more telephone reporting centers handling the initial claim reportings. The telephone reporting center then performs logistic data collection and entry of information relating to the claim, such as the name of the injured person/worker, social security number of the worker, the employer's address and plant location of the accident and description of the accident. The collected claim information relating to the injured worker and the accident is then transferred out of the telephone reporting center to a local claim service center, (also known as an adjusting field office or AFO) via a claim management system (e.g., T-MATE of Travelers), which is a triage center of the health and/or workers compensation insurance or health plan provider. As with the telephone reporting center, there may be more than one local claim service center or AFO.

At the AFO, a case handler is assigned to the claim. Part of the normal case set up of the case handler is to review the basic facts from the collected claim information and contact the injured worker to obtain additional facts and the injured worker's description of the accident. The case handler also contacts the employer to verify the information originally obtained by the telephone reporting center from the employer. Additionally, if a physician had provided medical care to the injured worker, the case handler also seeks out the physician to obtain the physician's diagnosis or prognosis of the injured worker and his/her injury. After completing the aforementioned inquiries, the case handler documents the additional facts along with the originally collected claim information, and sends via a system interface, to a medical case manager (MCM), i.e., an insurance claim professional, adjuster, or handler. The claim professional's task is to review the set of facts and—based on his/her professional opinion as a claim professional—determine whether the return-to-work (RTW) time for the injured worker can be impacted. If the claim professional judges that the RTW time will not be impacted, the claim professional will document a non-referral into the nurse's integrated case management system. However, if the claim professional judges that the RTW time can be impacted, the claim professional will open a medical referral and nurse assignment for the injured worker. The assigned nurse will then co-manage the claim with the claim adjuster, and work with the appropriate physicians to provide the necessary medical attention and treatment plan to expedite the recuperation of the injured worker and shorten the RTW time. It is in the interest of the WC insurance carrier to accelerate and pay a little more on the medical treatment and impact the RTW time of the injured worker in order to cut down on the higher cost of indemnity payment (i.e., wage replacement).

There are a number of problems associated with the current medical triage environment. First, it has been found that there were wide disparities at the AFO level in the medical referrals and assignments sent to the nurses. Some of the disparities include a wide variance of assignment percentage, inconsistent application of assignment procedures with assignments by diagnosis and severity of injury vary by office, and a significant number of inappropriate referrals were sent to the nurses. This is despite the fact that the claim professionals are given criteria for medical referrals. Second, because a claim professional's decision of nurse assignment is based partly on his/her individual experience on the job, turn-overs of claim professionals further add to the disparities in the medical triage process. New claim professionals with little or different knowledge will have different decisions on medical referrals from those of the more experienced claim professionals. Third, as more complex data relating to insurance claims and associated issues is amassed by an insurance carrier or health care provider, no one individual claim professional can effectively retain and act on such data. Fourth, it is difficult to find, recruit, and retain the claim professional staff due to their promotion, departure, or retirement. This problem has been addressed in the past by expanding recruiting; increasing training; segmenting the claim professional skills (e.g., ICU, RTW, CRU, CCU, medical); and paying for claim professional performance. Thus, there is a huge operational cost in maintaining a claim professional staff.

SUMMARY OF THE INVENTION

Generally, there exists a need for a method and system that gather the collective experience and intellectual capital of employees or workers of an organization and provide effective training/mentoring to each worker based on both his/her individual experience and the collective experience of the organization. Particularly, there exists a need for a method and system that gather the collective experience and intellectual capital of insurance claim professionals, such as MCMs and LP&E experts, of an insurance organization and provide virtual mentoring to each claim professional based on his/her individual experience and the collective experience of the insurance organization. For instance, when a claim involves an injured worker who has a repetitive motion injury, there is a need for LP&E experts and engineering services to make sure that the injured worker and others do not go back to the same work place design and suffer the same injury. The experience that all the claim professionals in the insurance organization have collected over all past claims of the same or similar type can be provided to assist a claim professional in handling a claim even though it is the first time that he/she has this particular type of claim.

Accordingly, the preferred embodiments of the present invention provide a method and system for knowledge management that includes capturing and retaining the collective experience and intellectual capital of an organization and its personnel; wherein the collective experience and intellectual capital can be used as tools to: 1) train and educate employees or workers of the organization in an interactive and meaningful manner; and 2) invest in the development of the employees/workers for future success.

The preferred embodiments of the present invention further provide a method and system for virtual mentoring that shares the collective experience and intellectual capital of an organization with employees or workers of the organization, and provides them with "just in time" training to enhance job performance and satisfaction and to achieve quality management results/outcomes—which are factors by which the employees or workers are measured in their work performance.

The preferred embodiments of the present invention also provide a method and system for virtual mentoring in which valuable information can be pushed to and pulled by employees or workers of an organization via on-line help in a just-in-time manner based on factors such as individual skill set, area of expertise, job code, length of service, and discretion. Thus, a more experienced employee is not inundated with extraneous information that he/she already possesses, and a less experienced employee is provided with more information and more opportunity to learn.

The preferred embodiments of the present invention also provide a method and system for virtual mentoring of personnel in an organization to assist such personnel with consistent application of organizational procedures and consistent performance of organizational tasks.

Additional aspects and novel features of the invention will be set forth in part in the description that follows, and in part will become more apparent to those skilled in the art upon examination of the present disclosure.

Acronyms

LP&E Loss Prevention and Engineering—Specialty resource that provides on-site evaluation to assist in the determination of causality (work-related of injury to job performed), return to work (workstation evaluations and job analyses for purposes of transitional duty), or subrogation purposes (evaluation of machine or product to determine cause of accident).

SIU Special Investigations Unit—Specialty resource that focuses on the investigation of claim fraud abuse.

MI Management Information—Analysis of claim data captured in claim systems to evaluate performance in the management of claims.

CRU Claim Resolution Unit—primarily responsible for managing inventory issues and CB (claim benefit) claims that involve no active lost time, and there is a concentrated focus on claim resolution.

CCU Critical Claim Unit—manages potentially high exposure cases involving complex issues of statutory benefit entitlement, medical diagnoses or injury severity, implementing aggressive, yet effective resolution plans focused on early case closure. It also co-manages appropriate claims with the Major Case Unit until issues are resolved.

ICU Investigative Claim Unit—investigates and resolves all compensability and policy coverage issues on claims; uses the necessary and appropriate investigative tools to resolve issues; manages to conclusion all claims in which coverage and/or compensability has been denied, and complies with all account Special Handling (SAC) Instructions.

IME Independent Medical Examinations

MCU Major Case Unit—manages (or co-manages with Service Center CCUs) the claims with catastrophic injuries, complex diagnoses and large losses, which make up the smallest volume of open inventory in Workers' Compensation, but involve the majority of loss dollars. MCU is staffed with highly knowledgeable and experienced claim and medical professionals.

QM Results/Outcomes Quality Management Results/Outcomes—The most important work activities (e.g., claim activities of a managed health provider) that really underscores the importance of the work (e.g., claim) management activities and are true indicators of the success in the management of various works (e.g., claims).

Subro Subrogation Unit—pursues offsets—a method of reducing a benefit, such as subrogation—based on the concept that the ultimate burden of a loss should be the responsibility of the wrongdoer. It reviews all lost-time claims with offsets potential, directs or completes any necessary investigation, and implements aggressive recovery strategies focused on maximum recovery.

SAC Special account communications—Additional services provided to a customer or more clearly documented information about the needs of a customer so that the claim handlers can better provide customer service.

BRIEF DESCRIPTION OF THE DRAWINGS

The preferred embodiments of the present invention are illustrated by way of example and not limited to the following figures and appendices, in which.

DETAILED DESCRIPTION OF THE INVENTION

Reference is now made in detail to embodiments of the present invention, an illustrative example of which is illustrated in the accompanying attachments, showing a method and system for knowledge management and virtual mentoring. In the context of the present invention, knowledge management refers to the management of knowledge that is essential, desired, informative, and/or helpful for a work force to perform particular chores and/or tasks. Whereas, virtual mentoring refers to the training or mentoring of a work force via electronic information download and/or retrieval. Although the present invention and its various embodiments may be directed to the application of knowledge management and virtual mentoring in an insurance claim setting, with reference to claim professionals and insurance organizations (e.g., insurers and managed care organizations), it is understood that the present invention and its various embodiments can be applied in any organizational setting to provide a more productive and efficient organizational work force.

According to an embodiment of the present invention, knowledge management includes tasks handling and knowledge to handle the tasks. For instance, knowledge management in an insurance claim setting is claims management, which includes claims handling and knowledge to handle the claims. As mentioned earlier, the ideal skills needed by a claim professional are expanding because of the increasing complex nature of the claims. For instance, a claim professional handling a WC claim must contend with a myriad of complex issues, including: pressure to reduce cost of delivery, consideration of state and federal intervention/legislation, medical litigation, and customer injured worker. Consequently, a claim professional must be proficient or an "expert" in many areas, and he/she needs to consistently execute the requisite skills, including but not limited to: claim knowledge, medical skills, communication skills, time management skills, and system knowledge. Thus, the knowledge that needs to be captured is the knowledge that enriches work life skills, provide mentoring options to the claim professionals, and in turn increase job performance and satisfaction.

Figure 1:
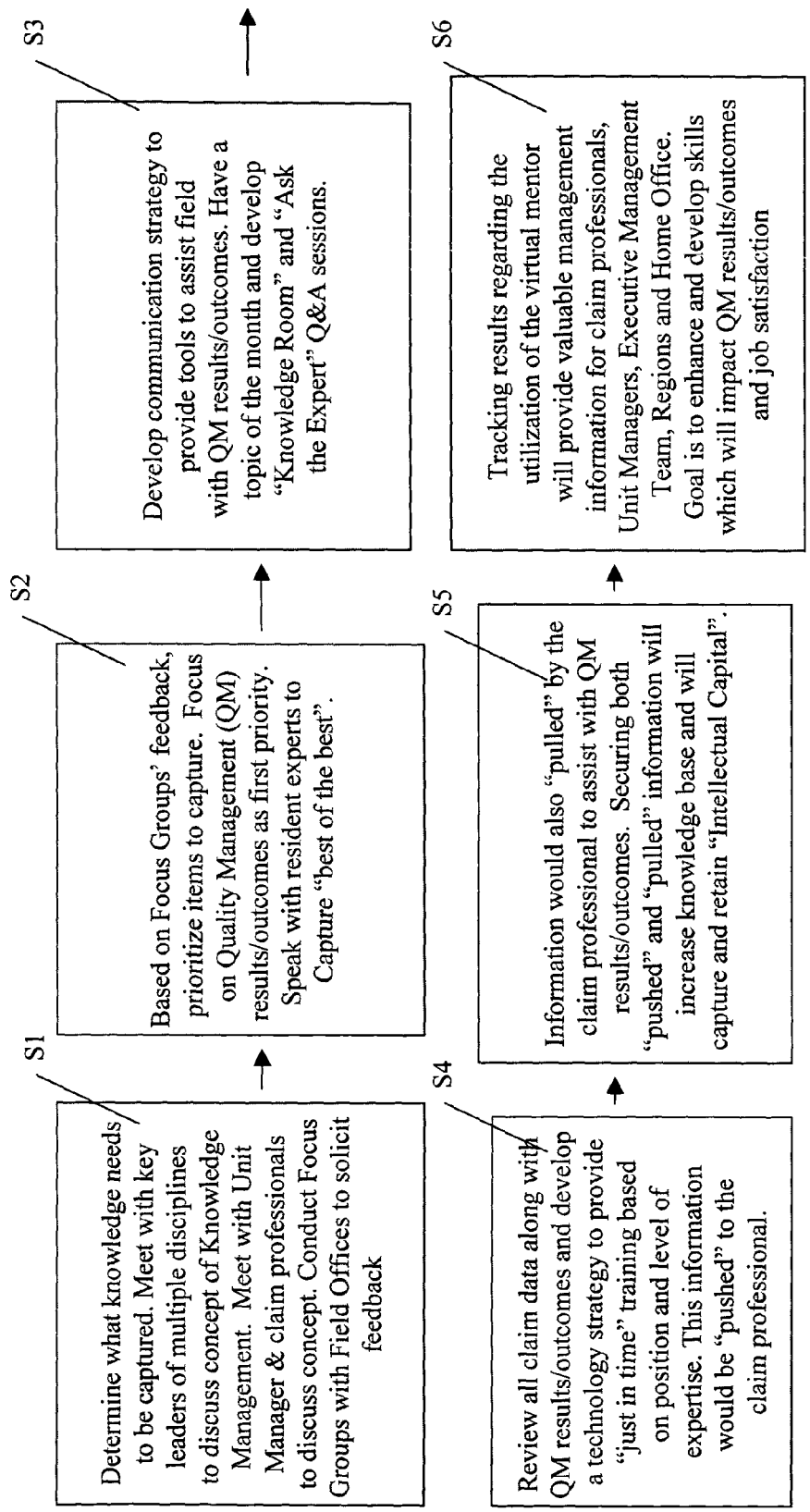
FIG. 1 depicts a virtual mentoring workflow in accordance with an embodiment of the present invention.

According to an embodiment of the present invention, virtual mentoring provides the claim professionals, such as MCMs, in an insurance organization with valuable information at the exact point during the management of a claim that such information is needed. Virtual mentoring also improves the skills of the claim professionals, providing just-in-time training and utilizing technology to assist with skill development. FIG. 1 shows a virtual mentoring workflow in accordance with an embodiment of the present invention. At S1, an organization, e.g., a managed care organization, makes a determination as to what needs to be captured from the knowledge of its employees. This is the initiation of knowledge management, and it may involve: 1) a discussion with key leaders of multiple disciplines in the organization to discuss the concept of knowledge management, obtain the Unit Managers' and claim professionals' insight and opinion on capturing tribal knowledge (i.e., knowledge of an individual or a group of similarly-situated individuals) within the organization, and identify QM results/outcomes; 2) discussions between selected key leaders and focus groups in the organization's field offices to solicit feedback on the concept, as developed by the key leaders and the focus groups; and 3) interactive discussions between the home office, information technology group/department, and focus groups on ways to achieve the QM results/outcomes and enhance job performance and satisfaction. The QM results/outcomes are factors by which the employees/workers are measured in their work performance. Hence, the QM results/outcomes are the most important work activities that really underscore the importance of the work management activities, and they are true indicators of the success in the management of the organization's works. Appendix A provides an example of a knowledge management focus group outline/questionaire that may be employed at S1 in the instance that the organization is a managed care organization. More questions and information can be obtained and incorporated as group discussions develop.

Based on S1, the first priority is to focus on the QM results/outcomes, wherein resident experts on QM results/outcomes are consulted to obtain or capture the "best of the best" individual experience and intellectual capital on QM results/outcomes at S2. At S3, additional knowledge can also be acquired via a communication strategy to provide tools to assist the field offices with QM results/outcomes. The strategy may include featuring/presenting a topic of the month and developing a virtual or actual "knowledge room" and/or bulletin board so that: 1) key leadership will be available to receive and provide valuable guidance to the claim professionals; 2) one or more topics or specialty areas can be featured to exchange or extract information from and among the users; for example, a featured topic would focus on medical privacy and how each state is either enacting new legislation or addressing any federal privacy rules and how they are interpreting it; 3) the claim professionals can "ask the expert" and obtain information on, e.g., specific injuries and medical position statement documentation; 4) specific reminders or tips that can assist the claim professionals during the claim and links to informative web sites, web pages, or other informative locations (e.g., WebMD, Technical Resource Manual, Litigation information, and Statute information); 5) questions, advices, and discussions at the designated accessing locations are captured and utilized as ongoing resources for the claim and medical professionals, and these resources are available in conjunction with the Unit Manager and the local experts to improve outcomes.

At S4, claim data is reviewed in conjunction with QM results/outcomes to develop a technology strategy to provide "just in time" training information based on position and level of expertise. This just-in-time information can be "pushed" or automatically provided to the appropriate claim professional that is handling a similar claim. The claim data in S4 is the result of predictive modeling. As understood in the art, the predictive modeling process is commonly used by managed care organizations to identify which of their members will have the highest future medical costs, target specialized interventions to improve the members' health care, and reduce future health care costs. Thus, the predictive modeling process captures years of claim experience (by capturing past claims that the organization had handled), identifies claims with the most potential for opportunity, and allows for efficient and effective referrals for specialty resource reviews. For example, the subrogation referral logic is based upon certain injury description codes. When a claim has a matching code, then the claim is automatically referred to the Recovery Unit for evaluation in the pursuit of third party recoveries.

While predictive modeling makes referrals and ensures consistency, it does not teach skills or supply guidance on how the claim professional should act under particular circumstances for a particular claim. Thus, virtual mentoring is used to leverage the experience and tribal knowledge (i.e., knowledge of an individual or a group of similarly-situated individuals) obtained in S1-S3 relating to a particular one or more insurance claims. The leveraged experience and tribal knowledge are then used in conjunction with the claim data obtained from predictive modeling to develop the aforementioned "just in time" training for claim professionals in S4. The training information can be pushed to the claim professional via pop-ups (e.g., pop-up screens or windows) in the claim professional's computer system, which is connected to a host data processing system of the insurance organization. For example, when the claim professional first receives or opens up an insurance claim—such as a repetitive motion injury—to handle, his/her system will pop up with initial information about the claim. If the claim professional is new to the job or the claim, he/she will be keyed off at a low level of experience based on his/her identification by the main server. Because the claim pertains to a repetitive motion injury, the claim professional will be provided with pop-up windows having initial information such as the kind of medical attention needed and the time out-of-work required for the particular injury, and repeat claim history. In another example, when the claim has been opened for a certain predetermined period of time—for example, 45 days—and certain medical claims or procedures have not been done, the host system will be triggered to provide the claim professional with pop-up screens or windows which remind him/her of possible activities to perform for the claim.

At S5, the training information also can be "pulled" or affirmatively retrieved by the claim professional to assist with QM results/outcomes. Thus, just-in-time on-line help is made available to the claim professional as a training tool. As a new claims handler, the claim professional can review the pop-up information and go to sources that are identified in the pop-up screens that can provide him/her with some ability to learn more information about repetitive motion injury. The claim professional can also get additional information or go to additional places within the host system to get more information. Consequently, the claim professional, based on his/her level of experience or exposure to insurance claims, is keyed or provided with certain information and certain experiential ideas that is developed out of the host system to direct the claim professional to different types of activities for the handled claim.

At S6, the results regarding the utilization of the virtual mentor can be tracked. These results can provide valuable management information for claim professionals, Unit Managers, Executive Management Teams, and Regional and Home Offices.

Consequently, the virtual mentoring process of the present invention improves outcomes and reduces loss costs by getting information to the claim profession when needed, raises the baseline for basic performance, allows information to be "pulled" when additional knowledge is needed, and creates a learning organization that continuously improves upon best practices.

Figure 2:
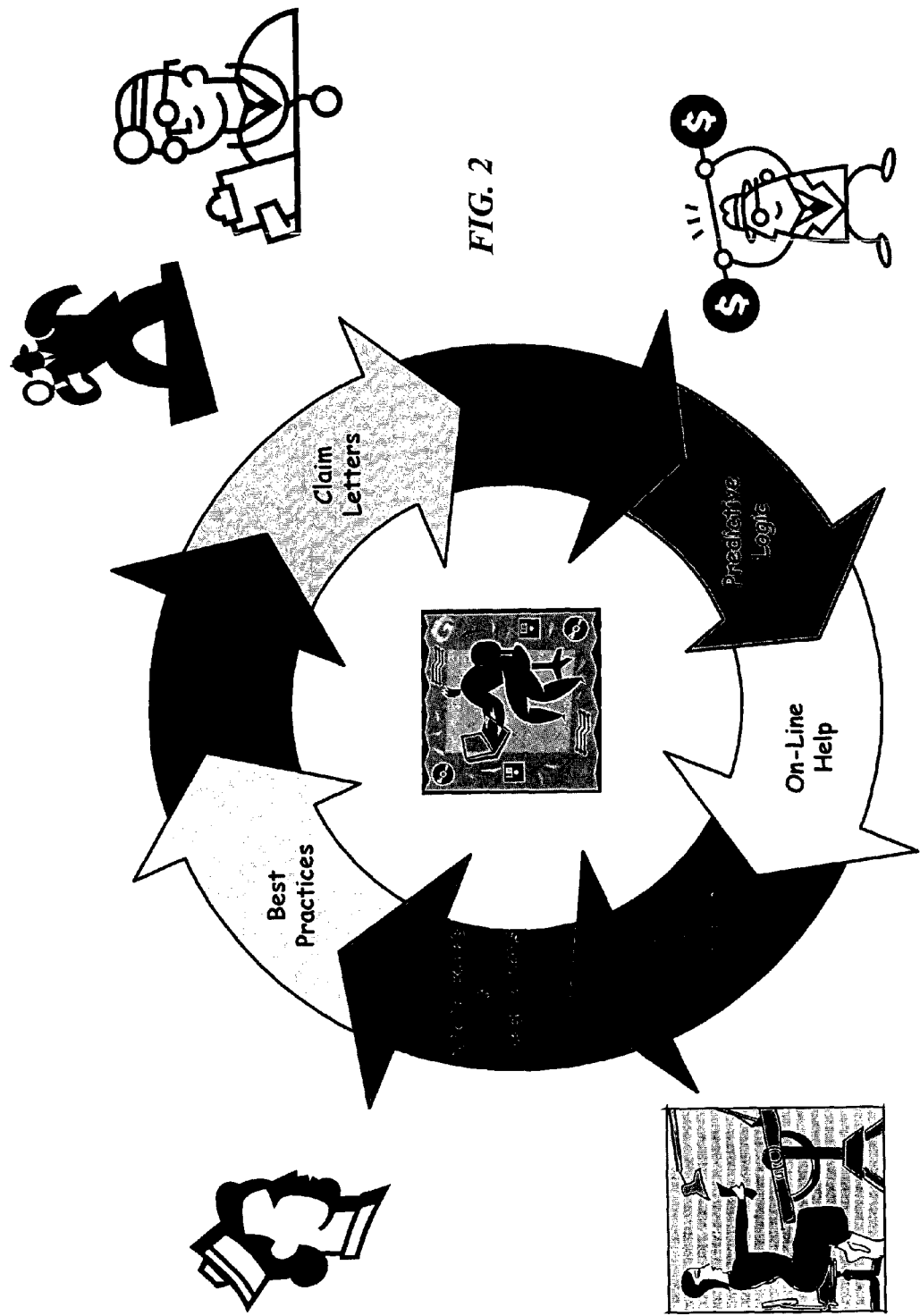
FIG. 2 depicts a high level diagram for the virtual mentoring process in accordance with an embodiment of the present invention.

FIG. 2 shows a high level diagram for the virtual mentoring process of the present invention. Specifically, the diagram entitled "Virtual Mentoring with 'Smart' Logic" shows the virtual mentoring components, in clockwise: 1) On-line help; 2) SAC instructions; 3) State Rules and Regulations; 4) Detailed Functional Best Practices; 5) Quality Management Results/Outcomes; 6) Techniques of Top "Functional" Experts; 7) Text Data Mining; and 8) Predictive Logic. These components are explained below with reference to FIG. 1.

The first virtual mentoring component is the on-line help, which initiates the virtual mentoring process. As mentioned earlier with reference to S4 and S5 in FIG. 1, the on-line help refers to the "pushing" and "pulling" of information that is available to the claim professional. Once on-line help is requested by ("pulled") or automatically forwarded to ("pushed) the claim professional, the next component, Special account communications (SAC) instructions, if any, is provided at S4 and/or S5 in FIG. 1. SAC instructions refer to customer-specific service requirements that the claim professional must meet in handling the claim. For instance, in a WC claim for an injured worker, the worker's company—the customer of the insurance organization handling the claim—may have specific requirements about company forms that need to be filled out and claim status updates that the insurance organization needs to provide the company. State Rules and Regulations, if any, refer to information about federal, state, or other governmental rules, regulations, or other legislation that the claim professional may need to comply in handling the particular insurance claim. For instance, in a WC claim, there may be a need for the insurance provider or injured worker to fill out governmental forms every 30 or 60 days. As with SAC instructions, the State Rules and Regulations can be "pushed" to or "pulled" by the claim professional in S4 and S5.

Detailed Functional Best Practices refer to established policies and procedures that outline the "best of the best" in claim management standards, as captured in S2 of FIG. 1. As mentioned earlier also with reference to S2, QM results/outcomes refer to factors by which the employees or workers are measured in their work performance. Techniques of Top "Functional" Experts refer to claim handling practices and other related knowledge obtained from experts in the field as mentioned in S1-S3. Text data mining refers to the collection of all information, such as the nature of the injury, about the particular claim being handled, and the history of the type of claim and injury based on past claims that are similar or of the same type. For example, the RTW target logic may be developed using data mining. As RTW claims are continually managed, the mined data may be evaluated with the results of the file outcomes to continuously enhance and further define the RTW target logic. For instance, if it is a back injury, and this type of injury historically has a 20-day RTW, such information will be provided to the claim professional as part of the predictive modeling as described earlier. Predictive logic, used in S4 to review the claim data in conjunction with QM results/outcomes, refers to the logic that leverages all of the information obtained from the other virtual mentoring components in order to provide the claim professional with options to proceed in the handling of the case. The predictive modeling process described earlier and medical triage are both parts of the predictive logic. For example, there may be provided an "auto-suggest" predictive logic for the referral to LP&E. The data is provided to the claim handlers so that they can learn "what causes" the referral so that they can recognize the facts earlier. For instance, based on the type of the claim and/or nature of injury, triage options may be provided to the claim professional to proceed with LP&E, SIU, or MCU.

Figure 3:
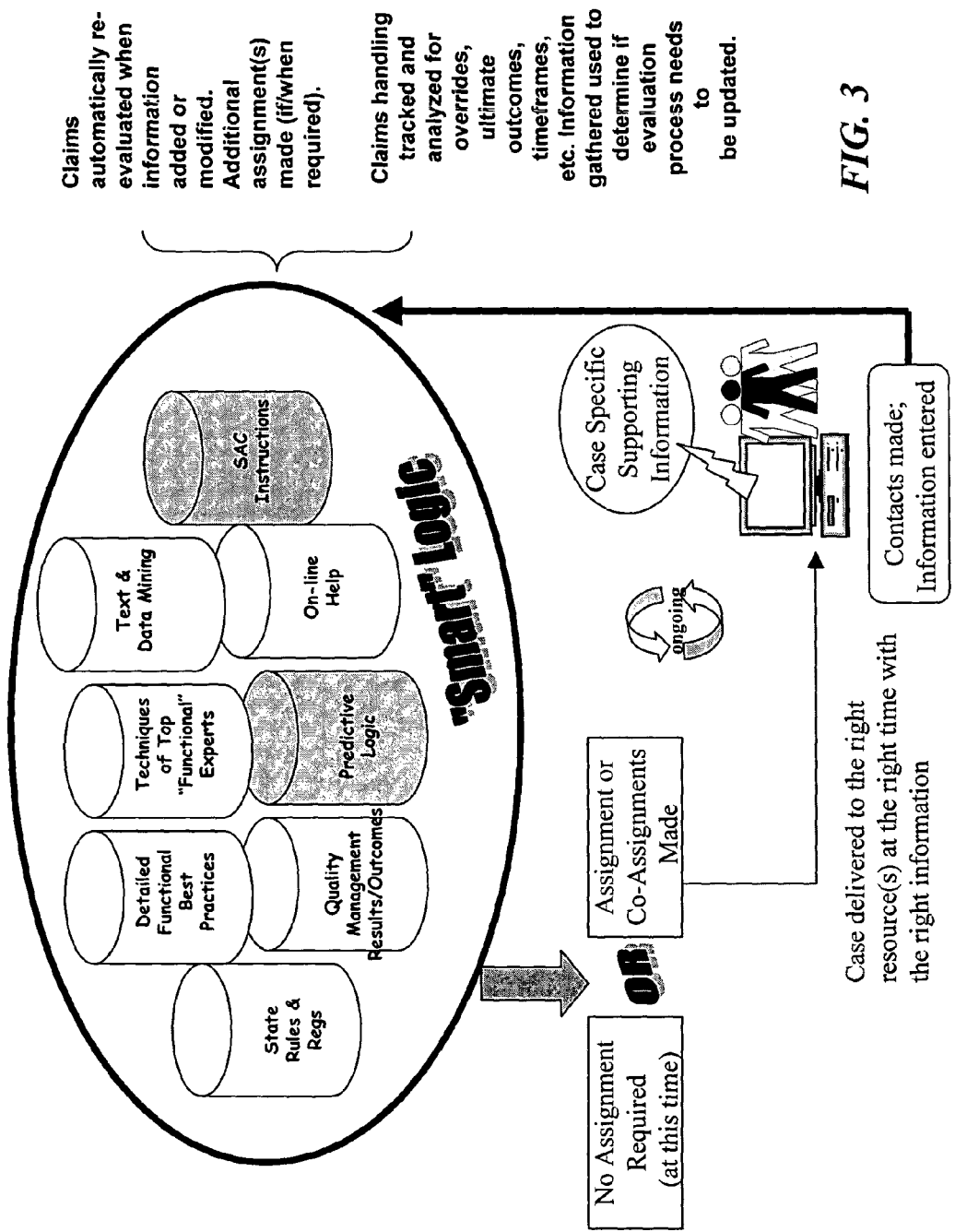
FIG. 3 depict the use of virtual mentoring components in accordance with an embodiment of the present invention.

FIG. 3 shows that the aforementioned virtual mentoring components are used to provide the claim professional with options to proceed in the handling of the claim. In this case, the virtual mentoring process may advise the claim professional to either provide a medical assignment or co-assignment to the claim or to hold off the assignment at this time.

Appendix A

Questions for discussion with key leaders of multiple disciplines and knowledge management focus groups within an organization:

1. What do you see as your highest priority while managing your work? Get each group to discuss QM results/outcomes and what items they found to have caused the most difficulty (contact, RTW issues, managing the physician, the injured worker or the insured, litigation, reserving, etc.)?

2. What would assist you in achieving your daily goals?

3. Of the items that are identified in 2, what are the top five items that the group feels is crucial?

4. If available, how would these top five items assist you in achieving your QM results/outcomes?

5. In what format would you like the information provided to you? ("pushed" or "pulled" and potential options for the way the information can be obtained, e.g., knowledge room, topical board, etc.)

6. What type of "trigger" would you like to have regarding when information is pulled or pushed to you?

7. How would the MI that will be captured assist you? What type of MI would be most beneficial?

8. How would you then utilize the MI (for training, tracking tends to enhance overall results, etc.)?

9. In your current position, what are the issues that you face (faced) during your first six months and today that prevents/prevented you from learning and effectively mastering the day aspects of your job?

10. If you well able to pull information on a claim or about a specific aspect of a claim, what information do you think you would access the most?

11. What items do you feel are difficult to find and use as a resource in the organization's claim management system? (Provide a discussion on best practices—pushing/pulling information to the right individual when needed)?

12. What do you feel is the biggest benefit from having a "Virtual Mentor" in your day-to-day management of your cases?

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A computer implemented method for providing virtual mentoring to an insurance claim professional of an insurance organization, comprising:
    electronically storing insurance based knowledge data relating to mentoring an insurance claim professional in a computer knowledge database determined by:
    electronically storing data obtained from conducting discussions with designated leaders of multiple disciplines and advisory entities within the organization about knowledge relating to the mentoring;
    electronically storing data determined from identifying various insurance based Quality Management (QM) results and outcomes considered by the organization based on the discussions; and
    electronically storing data from converting the insurance based QM results and outcomes into the knowledge data for storing in the computer knowledge database;
    electronically storing insurance based expert data determined from consulting experts on the identified insurance based QM results and outcomes within the organization to obtain each expert's individual experience and intellectual capital on the identified insurance based QM results and outcomes, and converting the expert's individual experience and intellectual capital into the expert data;
    electronically storing additional insurance based knowledge data relating to the mentoring determined through an exchange or extraction of information on designated topics that are presented in designated communications with members of the organization, and converting the exchanged or extracted information into the additional knowledge data for storing in the knowledge database;
    retrieving the stored insurance based knowledge data from the computer knowledge database, the stored insurance based expert data, and the stored additional insurance based knowledge data and compiling detailed functional insurance based best practices and techniques of top functional experts based on the obtained individual experiences and intellectual capital, on the identified insurance based QM results/outcomes, and on the additional insurance knowledge data;
    data mining and retrieving, by a computer, insurance based claim data of a plurality of claims of the insurance organization relating to the insurance based knowledge data and the additional insurance based knowledge data;
    performing, by the computer, predictive modeling of the insurance based claim data, to implement at least one of identifying claims with potential for opportunity to improve outcomes, identifying which customers of the insurance organization will have the potential for increased future medical costs, targeting specialized interventions to improve health care, reducing future health care costs, and providing efficient and effective referrals for specialty resource reviews, wherein the predictive modeling comprises at least one model that is updatable based on additions or modifications to the stored insurance based claim data;
    determining, by the computer, an experience of the insurance claim professional within the organization when present, wherein the experience is determined by at least one of a skill set, an area of expertise, a mob code, a length of service, a position, a level of expertise, a level experience and an exposure to insurance claims; and
    based on the experience of the insurance claim professional, providing, by the computer, the mentoring for the insurance claim professional by interactively guiding the insurance claim professional to process an identified claim responsive to at least one of the insurance based claim data, the insurance based knowledge data, the insurance based expert data, the additional insurance based knowledge data, predictive logic, the insurance based QM results and outcomes, and the insurance based functional best practices, to provide training information to the insurance claim professionals of the organization.

2. The method of claim 1, further comprising:
processing by the computer the insurance based claim data in conjunction with the insurance based QM results and outcomes; and
electronically transmitting training information based on the experience of the insurance claim professional.

3. The method of claim 1, further comprising:
processing by the computer the insurance based claim data in conjunction with the insurance based QM results and outcomes;
determining a predetermined insurance claim professional based on the experience of the insurance claim professional; and
automatically electronically transmitting to the predetermined insurance claim professional insurance claim processing information based on the experience of the insurance claim professional.

4. The method of claim 1, further comprising:
processing by the computer the insurance based claim data in conjunction with the insurance based QM results and outcomes;
determining a predetermined insurance claim professional based on the insurance claim professional processing a substantially similar insurance claim; and
automatically electronically transmitting to the predetermined insurance claim professional insurance claim processing information based on the insurance claim professional processing the substantially similar insurance claim.

5. The method of claim 1, further comprising automatically transmitting to the insurance claim professional, responsive to the level of experience, predetermined insurance information to direct the insurance claim professional to at least one type of action for processing the insurance claim.

6. The method of claim 1, further comprising automatically transmitting the insurance claim professional predetermined insurance information and to direct the insurance claim professional to at least one type of action for processing the insurance claim and specific information including, when present, at least one of rules and regulations that the insurance claim professional must satisfy when processing the insurance claim, including automatically administering the insurance claim with respect to the at least one of the rules and the regulations.

7. The method of claim 1, wherein said performing, by the computer, the predictive modeling of the insurance based claim data further comprises identifying, by the computer, insurance claims responsive to predetermined description codes to automatically transmit to a predetermined insurance claim professional having experience with processing insurance claims associated with the predetermined description code, insurance claim processing information to assist the predetermined insurance claim professional in processing the insurance claim.

8. The method of claim 1, further comprising:
determining by the computer when the additional information is at least one of added and modified in connection with the insurance claim; and
automatically transmitting to the insurance claim professional predetermined insurance information to direct the insurance claim professional to at least one type of actions for processing the insurance claim responsive to the additional information.

9. A computer implemented method for providing virtual mentoring to an insurance claim professional of an insurance organization, comprising:
electronically retrieving, from at least one computer database, stored insurance based knowledge data comprising collective experience and intellectual capital data of the insurance organization and its personnel, and stored insurance based claim data of a plurality of insurance based claims of the insurance organization;
performing, by a computer, data mining of the insurance based claim data, wherein said data mining further comprises performing, by the computer, predictive modeling of the insurance based claim data, to implement at least one of identifying claims with potential for opportunity to improve outcomes, identifying which customers of the insurance organization will have the potential for increased future medical costs, targeting specialized interventions to improve health care, reducing future health care costs, and providing efficient and effective referrals for specialty resource reviews, wherein the predictive modeling comprises at least one model that is updatable based on additions or modifications to the stored insurance based claim data;
determining, by the computer, an experience of the insurance claim professional within the organization, wherein the experience is determined by at least one of a skill set, an area of expertise, a job code, a length of service, a position, a level of expertise, a level experience and an exposure to insurance claims; and
based on the experience of the insurance claim professional, executing, by the computer, an interactive virtual mentoring process with the insurance claim professional which guides the insurance claim professional in administering a particular one or more of the insurance based claims, using the insurance based claim data, the insurance based knowledge data, and the predictive modeling of the insurance based claim data.

10. The method of claim 9, wherein the insurance based knowledge data includes at least one of special account instructions, state rules and regulations, functional best practices, quality management results or outcomes, and techniques of top functional experts.

11. The method of claim 9, wherein at least one of the insurance based knowledge data and the insurance based claim data relates to the particular one or more insurance claims.

12. The method of claim 9, wherein the virtual mentoring is executed responsive to individual experience of the insurance claim professional.

13. The method of claim 9, wherein the virtual mentoring is executed with a specific frequency or at a specific time during management of the insurance based claims.

14. The method of claim 9, wherein the virtual mentoring is executed responsive to one or more particular circumstances of the insurance based claims.

15. The method of claim 9, further comprising at least one of:
updating the stored insurance based claim data based on at least one of added or modified insurance claim information and insurance claim handling information; and
updating the stored insurance based knowledge data.

16. The method of claim 15, wherein the stored insurance based knowledge data is updated based on at least one of new or modified state rules and regulations and special account instructions.

17. The method of claim 9, wherein the predictive modeling identifies the insurance based claims for referral for at least one specialty resource review.

18. The method of claim 17, wherein the specialty resource is loss prevention and engineering, special investigations unit, major case unit, subrogation case unit, or medical management.

19. The method of claim 12, wherein the experience of the insurance claim professional is in at least one of investigative claim unit, return to work, claim resolution unit, critical claim unit, and medical.

20. The method of claim 9, further comprising automatically transmitting to the insurance claim professional, responsive to the level of experience, predetermined insurance information to direct the insurance claim professional to at least one type of action for processing the insurance claim.

21. The method of claim 9, further comprising automatically transmitting to the insurance claim professional predetermined insurance information to direct the insurance claim professional to at least one type of action for processing the insurance claim and customer specific information to allow the insurance claim professional to process customer-specific service requirements when processing the insurance claim.

22. The method of claim 9, further comprising automatically transmitting to the insurance claim professional predetermined insurance information to direct the insurance claim professional to at least one type of action for processing the insurance claim and customer specific information to allow the insurance claim professional to process customer-specific service requirements including customer forms and claim status updates that the insurance claim professional is required to provide the customer when processing the insurance claim.

23. The method of claim 9, further comprising automatically transmitting to the insurance claim professional predetermined insurance information to direct the insurance claim professional to at least one type of action for processing the insurance claim and specific information including, when present, at least one of rules and regulations that the insurance claim professional must satisfy when processing the insurance claim.

24. The method of claim 9, further comprising automatically transmitting the insurance claim professional predetermined insurance information and to direct the insurance claim professional to at least one type of action for processing the insurance claim and specific information including, when present, at least one of rules and regulations that the insurance claim professional must satisfy when processing the insurance claim, including automatically administering at least a portion of the insurance claim with respect to the at least one of the rules and the regulations.

25. The method of claim 9, further comprising automatically transmitting to the insurance claim professional predetermined insurance information to direct the insurance claim professional to at least one type of action for processing the insurance claim and specific information including, when present, at least one of rules and regulations that the insurance claim professional must satisfy when processing a workers compensation claim, including automatically transmitting to the insurance claim professional information for administering governmental forms for predetermined time intervals to process the workers compensation claim.

26. The method of claim 9, wherein said performing, by the computer, the predictive modeling of the insurance based claim data further comprises identifying, by the computer, insurance claims responsive to predetermined criteria to automatically transmit to a predetermined insurance claim professional insurance claim processing information to assist the predetermined insurance claim professional in processing the insurance claim.

27. The method of claim 9, wherein said performing, by the computer, the predictive modeling of the insurance based claim data further comprises identifying, by the computer, insurance claims responsive to predetermined criteria to automatically transmit to a predetermined insurance claim professional insurance claim processing information to assist the predetermined insurance claim professional in processing the insurance claim including determining whether to provide at least one of a medical assignment, co-assignment and suspend assignment of the insurance claim.

28. The method of claim 9, wherein said performing, by the computer, the predictive modeling of the insurance based claim data further comprises identifying, by the computer, insurance claims responsive to predetermined description codes to automatically transmit to a predetermined insurance claim professional having experience with processing insurance claims associated with the predetermined description code, insurance claim processing information to assist the predetermined insurance claim professional in processing the insurance claim.

29. The method of claim 9, further comprising:
 determining by the computer when the additional information is at least one of added and modified in connection with the insurance claim; and
 automatically transmitting to the insurance claim professional predetermined insurance information to direct the insurance claim professional to at least one type of actions for processing the insurance claim responsive to the additional information.

30. A computer implemented method for providing virtual mentoring to an insurance claim professional of an insurance organization, comprising:
 retrieving, from at least one computer database, stored insurance based knowledge data comprising insurance based Quality Management (QM) results and outcomes data, stored expert data comprising expert experience and knowledge on the insurance based QM results and outcomes data, and stored additional insurance based knowledge data relating to mentoring information collected from members of the insurance organization;
 compiling functional best practice data based on the stored expert data comprising expert experience and knowledge on the insurance based QM results and outcomes data and the stored additional insurance based knowledge data;
 performing, by a computer, predictive modeling of claim data from a plurality of claims of the insurance organization relating to the insurance based knowledge data and the additional insurance based knowledge data to implement at least one of identifying claims with potential for opportunity to improve outcomes, identifying which customers of the insurance organization will have the potential for increased future medical costs, targeting specialized interventions to improve health care, reducing future health care costs, and providing efficient and effective referrals for specialty resource reviews, wherein the predictive modeling comprises at least one model that is updatable based on additions or modifications to the stored insurance based claim data;
 determining, by the computer, an experience of the insurance claim professional within the organization, wherein the experience is determined by at least one of a skill set, an area of expertise, a job code, a length of service, a position, a level of expertise, a level experience and an exposure to insurance claims; and
 based on the experience of the insurance claim professional, providing, by the computer, the mentoring for the insurance claim professional by interactively guiding the insurance claim professional to review an identified claim responsive to the claim data collected from the plurality of claims, state rules and regulations, special account instructions, on-line help, the predictive modeling, the insurance based QM results and outcomes data, the functional best practices data, and the expert data to provide training information to the insurance claim professionals of the insurance organization.

31. The method of claim 30, further comprising:
 processing by the computer the insurance based claim data in conjunction with the insurance based QM results and outcomes; and
 electronically transmitting training information based on the experience of the insurance claim professional.

32. The method of claim 30, further comprising:
 processing by the computer the insurance based claim data in conjunction with the insurance based QM results and outcomes;
 determining a predetermined insurance claim professional based on the experience of the insurance claim professional; and
 automatically electronically transmitting to the predetermined insurance claim professional insurance claim processing information based on the experience of the insurance claim professional.

33. The method of claim 30, further comprising:
  processing by the computer the insurance based claim data in conjunction with the insurance based QM results and outcomes;
  determining a predetermined insurance claim professional based on the insurance claim professional processing a substantially similar insurance claim; and
  automatically electronically transmitting to the predetermined insurance claim professional insurance claim processing information based on the insurance claim professional processing the substantially similar insurance claim.

34. The method of claim 30, further comprising automatically transmitting to the insurance claim professional, responsive to the level of experience, predetermined insurance information to direct the insurance claim professional to at least one type of action for processing the insurance claim.

35. The method of claim 30, further comprising automatically transmitting the insurance claim professional predetermined insurance information and to direct the insurance claim professional to at least one type of action for processing the insurance claim and specific information including, when present, at least one of rules and regulations that the insurance claim professional must satisfy when processing the insurance claim, including automatically administering the insurance claim with respect to the at least one of the rules and the regulations.

36. The method of claim 30, wherein said performing, by the computer, the predictive modeling of the insurance based claim data further comprises identifying, by the computer, insurance claims responsive to predetermined description codes to automatically transmit to a predetermined insurance claim professional having experience with processing insurance claims associated with the predetermined description code, insurance claim processing information to assist the predetermined insurance claim professional in processing the insurance claim.

37. The method of claim 30, further comprising:
  determining by the computer when the additional information is at least one of added and modified in connection with the insurance claim; and
  automatically transmitting to the insurance claim professional predetermined insurance information to direct the insurance claim professional to at least one type of actions for processing the insurance claim responsive to the additional information.

38. The method of claim 30, further comprising automatically transmitting to the insurance claim professional predetermined insurance information to direct the insurance claim professional to at least one type of action for processing the insurance claim and customer specific information to allow the insurance claim professional to process customer-specific service requirements when processing the insurance claim.

39. The method of claim 30, further comprising automatically transmitting to the insurance claim professional predetermined insurance information to direct the insurance claim professional to at least one type of action for processing the insurance claim and customer specific information to allow the insurance claim professional to process customer-specific service requirements including customer forms and claim status updates that the insurance claim professional is required to provide the customer when processing the insurance claim.

40. The method of claim 30, further comprising automatically transmitting to the insurance claim professional predetermined insurance information to direct the insurance claim professional to at least one type of action for processing the insurance claim and specific information including, when present, at least one of rules and regulations that the insurance claim professional must satisfy when processing the insurance claim.

41. The method of claim 30, further comprising automatically transmitting to the insurance claim professional predetermined insurance information to direct the insurance claim professional to at least one type of action for processing the insurance claim and specific information including, when present, at least one of rules and regulations that the insurance claim professional must satisfy when processing a workers compensation claim, including automatically transmitting to the insurance claim professional information for administering governmental forms for predetermined time intervals to process the workers compensation claim.

42. The method of claim 30, wherein said performing, by the computer, the predictive modeling of the insurance based claim data further comprises identifying, by the computer, insurance claims responsive to predetermined criteria to automatically transmit to a predetermined insurance claim professional insurance claim processing information to assist the predetermined insurance claim professional in processing the insurance claim.

43. The method of claim 30, wherein said performing, by the computer, the predictive modeling of the insurance based claim data further comprises identifying, by the computer, insurance claims responsive to predetermined criteria to automatically transmit to a predetermined insurance claim professional insurance claim processing information to assist the predetermined insurance claim professional in processing the insurance claim including determining whether to provide at least one of a medical assignment, co-assignment and suspend assignment of the insurance claim.

\* \* \* \* \*